United States Patent [19]
Tullis

[11] Patent Number: 6,011,628
[45] Date of Patent: *Jan. 4, 2000

[54] GRADE MEASUREMENT DEVICE

[76] Inventor: Philip H. Tullis, 2800 E. Park, Taylorville, Ill. 62568

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,670

[22] Filed: Jan. 30, 1997

[51] Int. Cl.[7] .................................................. G01J 3/28
[52] U.S. Cl. ............................. 356/399; 33/286; 33/293
[58] Field of Search ................................... 356/399–401, 356/139–139.1, 141.1–141.5, 152.1–152.3, 153, 150, 138, 148; 33/294, 292, 293, 286, 299, 295–298

[56] References Cited

U.S. PATENT DOCUMENTS

| | | |
|---|---|---|
| 3,314,068 | 4/1967 | Verive . |
| 3,367,031 | 2/1968 | Ward . |
| 3,894,230 | 7/1975 | Rorden et al. . |
| 4,030,832 | 6/1977 | Rando et al. . |
| 4,240,208 | 12/1980 | Pehrson . |
| 4,345,382 | 8/1982 | Warren . |
| 4,471,532 | 9/1984 | Francis . |
| 4,993,160 | 2/1991 | Fraley . |

*Primary Examiner*—K P Hantis
*Attorney, Agent, or Firm*—Brinks Hofer Gilson & Lione

[57] ABSTRACT

A grade measurement device for use with a transmitter operable to produce a radiant energy beam. The grade measurement device includes a base and a support member. The support member is movably coupled to the base. A detector operable to detect the radiant energy beam is disposed on the support member at a selected position. The detector is also operable to indicate detection of the radiant energy beam. A connection mechanism couples the support member and the base.

20 Claims, 3 Drawing Sheets

FIG. 2
FIG. 3
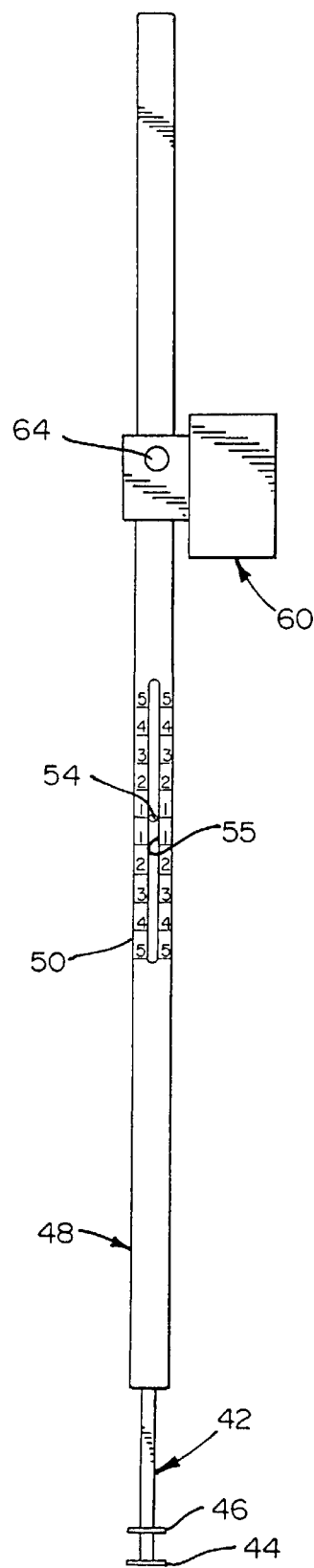
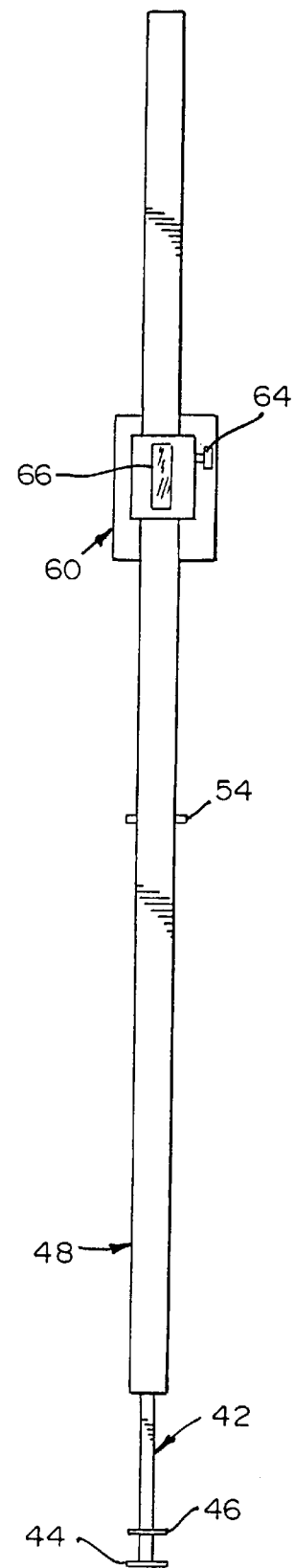

6,011,628

1

GRADE MEASUREMENT DEVICE

BACKGROUND OF THE INVENTION

The present invention relates generally to an improved grade measurement device. More particularly, the present invention relates to an improved grade measurement rod having a base and a support member movably connected to each other.

When constructing a building, road, or the like, it is important that a contractor be able to establish a level surface. To accomplish this task, surveying or grade measurement rods have been used together with a transmitter operable to produce a radiant energy beam, e.g., a laser beam or sound beam. The grade measurement rod includes a detection mechanism operable to detect the radiant energy beam, e.g., a photocell or sound detection device.

In use, a contractor establishes a horizontal reference position by placing the device operable to produce the radiant energy beam at a selected horizontal position. The radiant energy beam establishes a plane a predetermined distance above the base surface from which variations are measured. The device operable to produce the radiant energy beam may be positioned anywhere within the construction area as long as there are no obstructions between the radiant energy beam and the detection mechanism. The detection mechanism is then positioned at the same height above the base surface as the device operable to produce the radiant energy beam. In this manner, the detection of the radiant energy beam indicates that a level plane extends between the two positions. If the detection mechanism fails to detect the radiant energy beam, an angled surface exists between the two positions. A contractor then manually adjusts the detection mechanism by releasing it from the support structure and sliding it up or down until the radiant energy beam is detected. A scale adjacent the detection mechanism is used to indicate the relative distance that the detection mechanism has been adjusted thereby providing a measurement of the relative vertical distance between the two positions. Using this information, the contractor can adjust the base surface as needed in order to provide for a level surface.

One example of a previous survey system is disclosed in U.S. Pat. No. 3,314,068 issued to Verive. In Verive, a transmitting antenna is positioned at a selected point. The radiant energy beam is transmitted at a predetermined height above the base surface. A receiving device is movably attached to a gauge pole and positioned a selected distance away from the transmitter. The receiving device can be slidably adjusted on the pole in order to be raised or lowered to a new height. This relative adjustment indicates the relative vertical distance between the plane defined by the radiant energy beam and the receiving device. The disclosed receiving device includes a handle in order to provide for the vertical adjustment of this device on the pole.

However, a significant disadvantage exists in the prior grade measurement devices. In particular, the adjustment mechanism on the receiving device can be somewhat cumbersome to operate in the field. If the plane being measured by the rod is not level, it can be difficult and cumbersome for a contractor to hold the rod and simultaneously release and adjust the positioning of the detection mechanism. Accordingly, there is a need for an improved grade measurement rod having a receiving device that may be easily adjusted from a first height to a second height.

SUMMARY OF THE INVENTION

The present invention relates to a grade measurement device for use with a transmitter operable to produce a

2 radiant energy beam. The grade measurement device includes a base and a support member. The support member is movably, and preferably slidably, coupled to the base. A detector operable to detect the radiant energy beam is disposed on the support member at a selected position. The detector is also operable to indicate detection of the radiant energy beam. A connection mechanism couples the support member and the base.

According to one aspect of the present invention, the connection mechanism is formed from a resilient element.

According to another aspect of the present invention, the grade measurement device includes a linear movement indicator.

The present invention will be best understood by reference to the following detailed description taken in conjunction with the accompanying drawings.

BRIEF DESCRIPTION OF THE DRAWINGS

FIG. 2 is a side view of the grade measurement rod shown in FIG. 1;

FIG. 3 is a rear view of the grade measurement rod shown in FIGS. 1–2;

DETAILED DESCRIPTION OF THE PREFERRED EMBODIMENTS

The invention is described with reference to the drawings in which like elements are referred to by like numerals.

Figure 1:
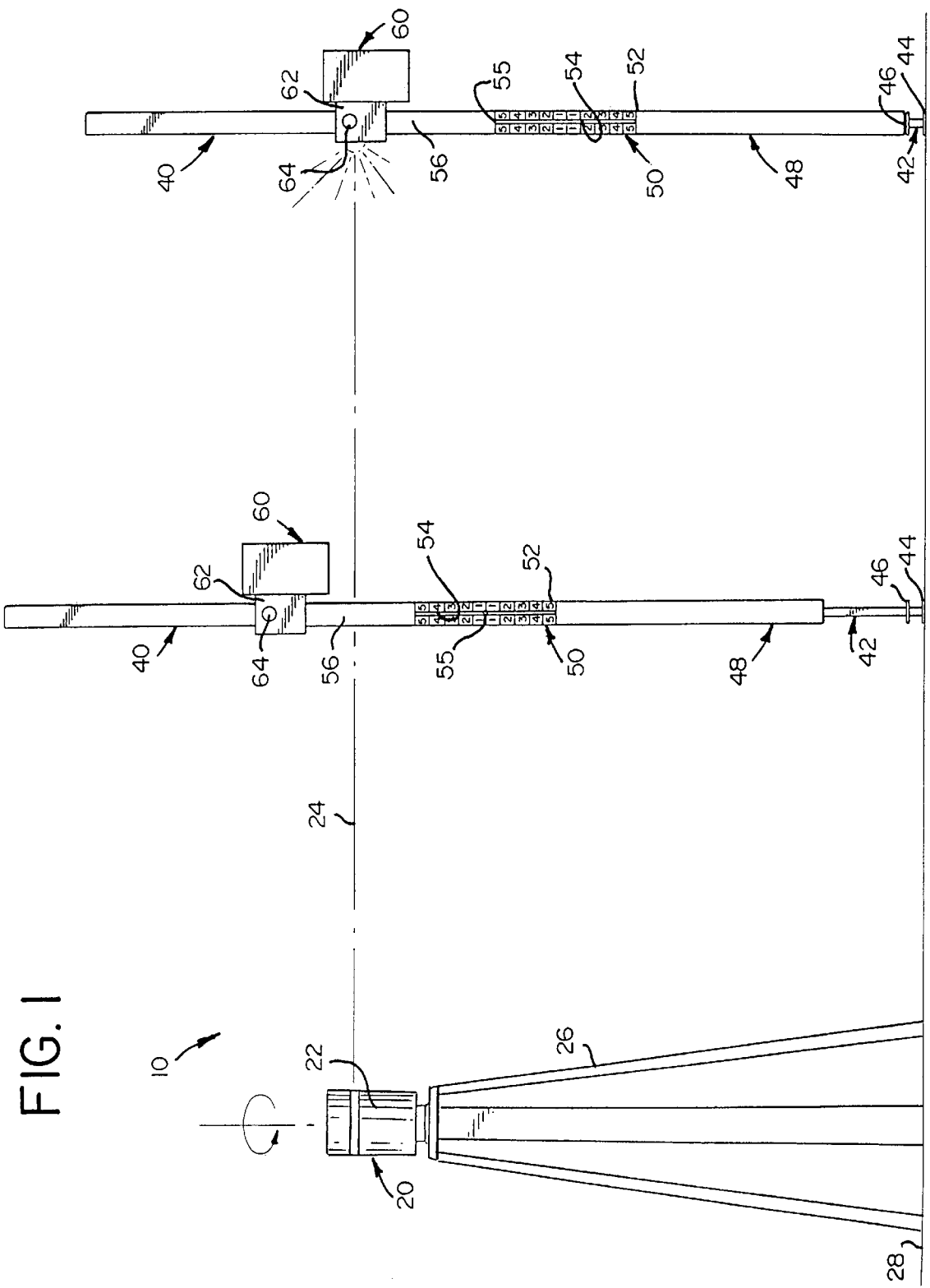
FIG. 1 is a pictorial view of a grade measurement system which employs a preferred embodiment of the present invention shown with the detector at a first height where the detection of the radiant energy beam does not occur and at a second height where the detection of the radiant energy beam does occur.

FIG. 1 is a pictorial view of a grade measurement system 10 illustrating the use of one preferred embodiment of the present invention. The transmitter 20 includes a transmitting element 22 that is operable to produce a radiant energy beam. According to a preferred embodiment of the present invention, the transmitting element 22 is operable to produce a laser beam 24. The transmitting element 22 of the transmitter 20 is adjustably mounted on a support, such as a tripod 26. The transmitting element 22 is operable to produce a laser beam 24 that revolves in a desired plane above a base surface 28, e.g., ground level.

A suitable transmitter of this type is commercially available from Laser Alignment, Inc. of Grand Rapids, Minn., as Model No. 3900. It should be recognized, however, that the present invention could also be used with devices operable to produce other types of radiant energy, e.g., a sound beam.

The grade measurement rod 40 is shown having a base 42 with a foot 44. In use, the foot 44 rests on the position being measured. A stop element 46 is fixed above the foot 44 in order to prevent movement of base 42 into the support member 48 beyond that point.

A linear movement indicator 50 is located on opposite sides of the support member 48 (one of two shown). The linear movement indicator 50 provides a reading of the vertical movement between the support member 48 and the base 42. According to a preferred embodiment, a scale 52 is located adjacent the slot 54 and the indication element 55. While the markings on scale 52 are in inches, the scale 52 could also be set in other units, e.g., centimeters or tenths of inches. It should be recognized that other known linear movement indicators could also be used with the present invention, e.g., other mechanical, magnetic inductor or electrical indicator.

Mounted on a top portion 56 of the support member 48 is a detector 60. The detector 60 is operable to detect the selected form of radiant energy emitted by the transmitting element 22. The detector 60 includes a mounting bracket 62 and a set screw 64 in order to fixedly secure the detector 60 in place on the support member 48. As shown in FIG. 3, a window 66 is located on the outer surface of the detector 60. Behind the window 66, a photocell or other similar device is located so as to detect the laser beam 24 being produced by the transmitting element 22. Impingement of the laser beam 24 on the detector 60 causes the device to emit a signal, such as an audible or visual signal, thereby indicating that a level plane exists between the transmitting element 22 and the detector 60. A suitable detector is available from Laser Alignment, Inc. of Grand Rapids, Minn.

As explained herein, it is an important aspect of the present invention that the detector 60 does not have to be moved relative to the support member 48 when in use. Rather, the support member 48 is adjusted linearly relative to the base 42 in order to detect the laser beam 24.

Figure 4:
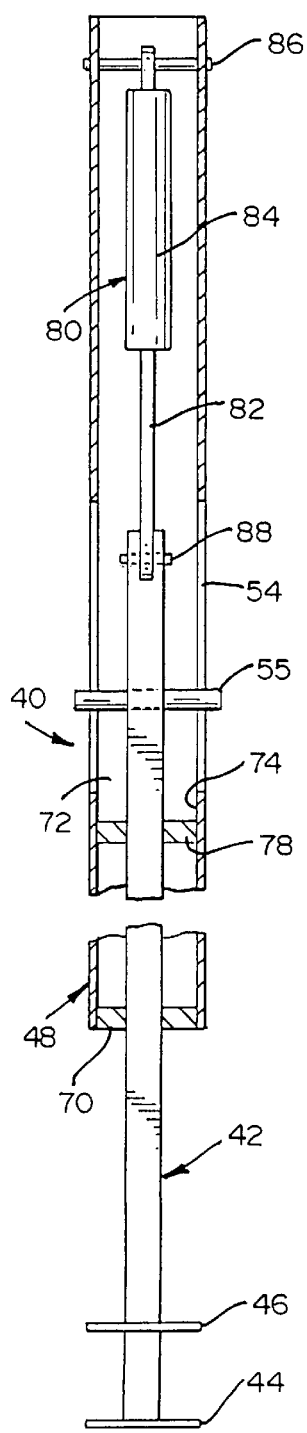
FIG. 4 a partial cross-section of the grade measurement rod shown in FIGS. 1–3 taken along the lines 4—4 of FIG. 2.
Figure 5:
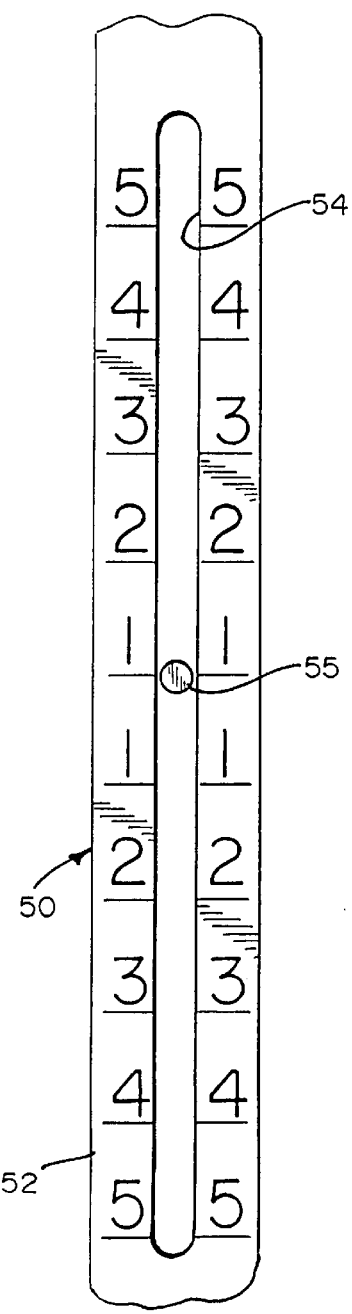
FIG. 5 is a view of the scale shown in FIGS. 1–2.

Reference is made to FIGS. 4 and 5 to better understand the internal components of one preferred embodiment of the grade measurement rod 40. The base 42 passes through an opening on a first plate 70 and into a cavity 72 defined by the inner walls 74 of the support member 48. An indication element 55 is attached to the upper portion of the base 42 and passes through the slots 54 located on the sides of the support member 48 and adjacent the scale 52. The base 42 also passes through a second plate 78 positioned in a lower portion of the support member 48.

A connection element is shown coupling the base 42 and the support member 48. According to the preferred embodiment shown in FIGS. 1–5, the connection element is a resilient element such as a conventional gas spring 80. The gas spring 80 includes a rod 82 that is slidably received within the housing 84. The housing 84 is fixedly secured via the bracket 86 to the inner walls 74 of the support member 48. The rod 82 is secured to the upper portion of the base 42 through the pin 88. As those of ordinary skill in the art will recognize, the gas spring 80 should produce enough force to maintain the indication element 55 in a central location within the slot 54. However, the gas spring 80 should also be capable of being easily pressed downward or upward through application of a force on the support member 48. Preferably, the gas spring 80 should be capable of producing a force between 5–12 lbs.

Figure 6:
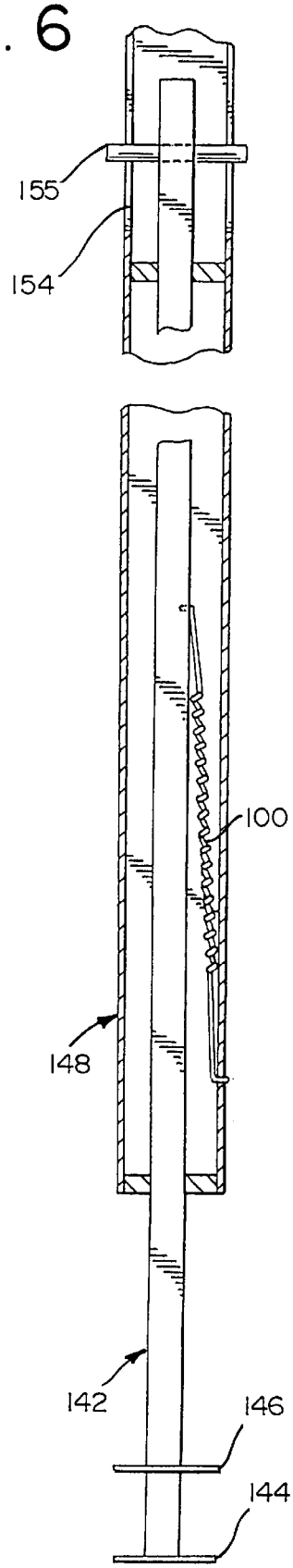
FIG. 6 a cross-section of a second embodiment of the grade measurement rod of the present invention.

Another preferred embodiment of the present invention is shown in FIG. 6. This embodiment is constructed in essentially the same manner as the embodiment of FIGS. 1–5 except that the gas spring 80 is replaced by a conventional coil spring 100. As those of ordinary skill in the art will recognize, other commonly available connection elements may also be used with the present invention.

According to the preferred embodiment of the present invention, the grade rod has an overall length of approximately 10' and is constructed from aluminum. However, as those of ordinary skill in the art will recognize, the grade rod of the present invention can have a wide variety of heights including up to 25'. The preferred base 42 is a 0.5" square rod. The support member 48 is preferably constructed from a 1.5" square tube.

In use, as shown in FIG. 1, the transmitter 20 is positioned at a selected position in the construction area against which another position will be measured. The transmitting element 22 is set so as to produce a laser beam 24 that establishes a plane a predetermined distance above the base surface 28 from which variations are measured. The grade measurement rod 40 is then placed at another position in the construction area. The detector 60 would then be positioned on the support member 48 so as to produce a signal when a level plane exists between the two positions. If the detector 60 does not produce a signal indicating a level plane exists between the two positions, the user then slides the support member 48 upwards or downwards until the detector 60 indicates that the laser beam 24 has been detected. The user then consults the relative positioning of the indication element 55 along the scale 52. The indication element 55 thereby gives an indication of the relative vertical distance between the plane defined by the laser beam 24 and the detector 60. This information is then used by the contractor as needed to adjust the surface between the two positions.

While the invention has been described with reference to a preferred embodiment, it should be understood that various changes may be made to the disclosed embodiments without departing from the scope of the invention. For example, various commonly available detectors, transmitters, or linear movement indicators could be used with the present invention. In addition, while the present invention is useful in constructing a level surface, it is also useful in constructing a surface having a fixed grade. Therefore, the scope of the invention is defined by the appended claims, and all devices or systems that come within the meaning of the claims, either literally or by equivalents, are intended to be embraced therein.

I claim:

1. A grade measurement device for use with a transmitter operable to produce a radiant energy beam, the grade measurement device comprising:

a base for use adjacent a base surface;

a support member resiliently movable relative to the base;

a detector connected to the support member at a selected position, the detector resiliently adjustable from a first position to a second position and operable to detect the radiant energy beam produced by the transmitter and indicate detection of the radiant energy beam;

a non-motorized and resilient connection mechanism coupling the base and the support member in a resilient manner, the connection mechanism operable to provide for the resilient movement of the support member relative to the base and;

a linear movement indicator automatically movable in response to the resilient movement of the detector from the first position to the second position and provide a positive indication of the amount of relative resilient movement.

2. The grade measurement device of claim 1 wherein the connection mechanism comprises a spring.

3. The grade measurement device of claim 2 wherein the support member includes an internal cavity that receives the base.

4. The grade measurement device of claim 3 wherein the radiant energy beam is produced by a laser.

5. The grade measurement device of claim 2 further comprising a linear movement indicator.

6. The grade measurement device of claim 5 wherein the linear movement indicator has an indication element attached to the base and extending into a slot on an outside surface of the support member adjacent a scale.

7. The grade measurement device of claim 6 wherein the base and the support member are formed from aluminum.

8. A grade measurement device for use with a transmitter operable to produce a radiant energy beam, the grade measurement device comprising:
   a base for use adjacent a base surface;
   a support member movably coupled to the base;
   a detector connected to the support member at a selected position, the detector resiliently adjustable from a first position to a second position and operable to detect the radiant energy beam produced by the transmitter and indicate detection of the radiant energy beam;
   a non-motorized mechanism coupling the base and the support member, the connection mechanism operable to provide for resilient movement of the detector; and
   a linear movement indicator automatically movable in response to the resilient movement of the detector from the first position to the second position and provide a positive indication of the amount of relative resilient.

9. The grade measurement device of claim 8 wherein the connection mechanism comprises a resilient element.

10. The grade measurement device of claim 8 wherein the support member includes an internal cavity that receives the base.

11. The grade measurement device of claim 10 wherein the radiant energy beam is produced by a laser.

12. The grade measurement device of claim 11 wherein the linear movement indicator comprises an indication element attached to the base and extending into a slot on an outside surface of the support member adjacent a scale.

13. The grade measurement device of claim 12 wherein the base and the support member are formed from aluminum.

14. The grade measurement device of claim 12 wherein the connection mechanism comprises a spring.

15. A grade measurement system for use in setting and checking grades, the grade measurement system comprising:
   a transmitter operable to produce a radiant energy beam;
   a grade measurement device comprising:
      a base for use adjacent a base surface;
      a support member movably coupled to the bases;
      a detector connected to the support member at a selected position, the detector resiliently adjustable from a first position to a second position and operable to detect the radiant energy beam; and
      a non-motorized connection mechanism coupling the base and the support member, the connection mechanism operable to provide for the resilient movement of the detector; and
      a linear movement indicator automatically movable in response to the resilient movement of the detector from the first position to the second position and provide a positive indication of the amount of relative resilient movement.

16. The grade measurement system of claim 15 wherein the connection mechanism comprises a spring.

17. The grade measurement system of claim 16 wherein the support member includes an internal cavity that receives the base.

18. The grade measurement system of claim 17 wherein the grade measurement device further comprises a linear movement indicator having an indication element attached to the base and extending into a slot on an outside surface of the support member adjacent a scale.

19. The grade measurement system of claim 18 wherein the base and the support member are formed from aluminum.

20. The grade measurement system of claim 18 wherein the radiant energy beam is produced by a laser.

* * * * *